United States Patent [19]

Yoshida et al.

[11] Patent Number: 5,206,566
[45] Date of Patent: Apr. 27, 1993

[54] ACCESS METHOD OF ACTUATOR AND CONTROL APPARATUS THEREFOR

[75] Inventors: Shuichi Yoshida, Osaka; Mitsuo Tokura; Noriaki Wakabayashi, both of Hirakata, all of Japan

[73] Assignee: Matsushita Electric Industrial Co., Ltd., Kadoma, Japan

[21] Appl. No.: 664,565

[22] Filed: Mar. 5, 1991

[30] Foreign Application Priority Data

Mar. 8, 1990 [JP] Japan .................................. 2-57167
Jun. 18, 1990 [JP] Japan .................................. 2-159019

[51] Int. Cl.5 .............................................. G05B 19/42
[52] U.S. Cl. ........................... 318/568.22; 318/568.11; 318/574; 364/474.35; 901/9; 395/3
[58] Field of Search ............... 318/638, 651, 652, 569, 318/567, 568.1, 568.11, 568.22, 574, 561; 364/513, 424.1, 474.15, 474.28, 474.35; 901/9, 14-18

[56] References Cited

U.S. PATENT DOCUMENTS

| | | | |
|---|---|---|---|
| 4,882,526 | 11/1989 | Iino et al. | 318/561 |
| 4,967,129 | 10/1990 | Tanaka | 318/621 |
| 5,047,701 | 9/1991 | Takarada et al. | 318/568.1 |
| 5,057,757 | 10/1991 | Orii | 318/599 |

OTHER PUBLICATIONS

C. Denis Mee and Eric D. Daniel, "Magnetic Recording" vol. 2, pp. 37–47, Chapter 2, Data Storage on Rigid Disks.

Primary Examiner—William M. Shoop, Jr.
Assistant Examiner—David Martin
Attorney, Agent, or Firm—Cushman, Darby & Cushman

[57] ABSTRACT

A method and apparatus for high speed, high precision control of an actuator. An initializing process sets control signals for moving the actuator a set of predetermined distances using fuzzy logic. Control of actuator movement is then performed using these predetermined set control signals and their corresponding distances. Movement of the actuator to target distance lying between the control signal distances are achieved by an interpolation operation using fuzzy logic.

18 Claims, 15 Drawing Sheets

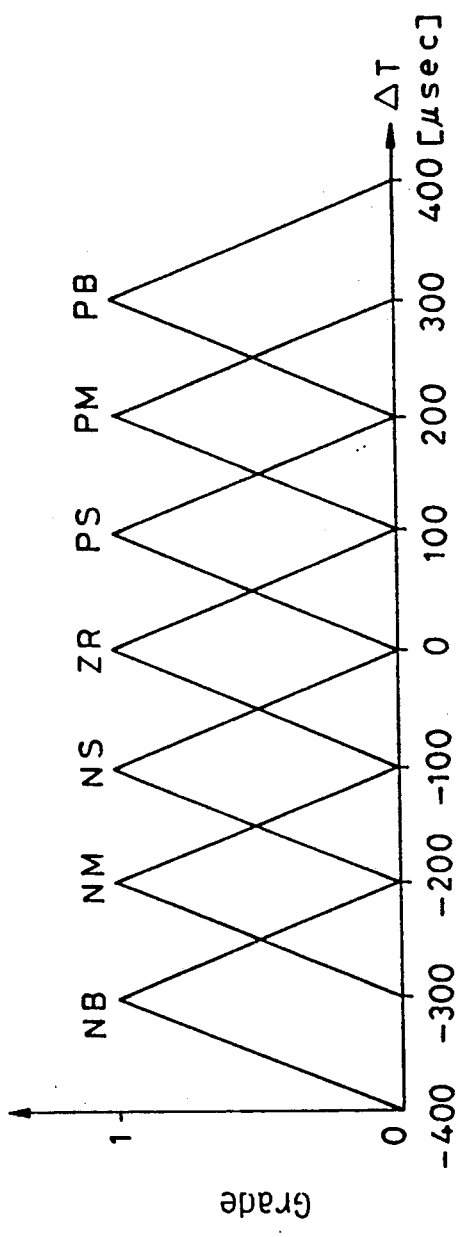

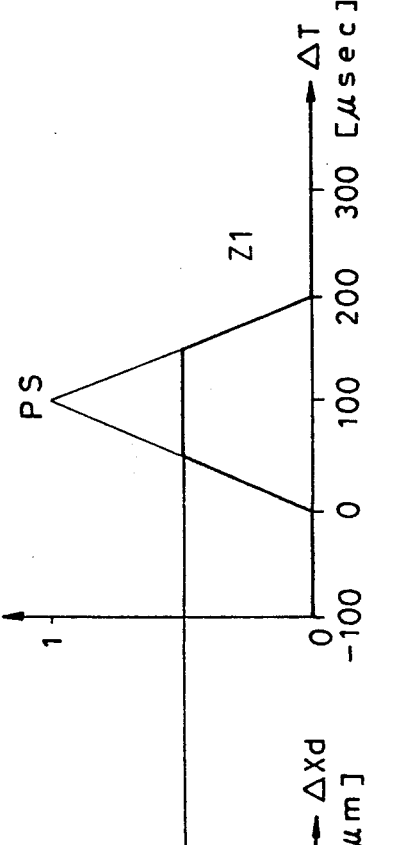
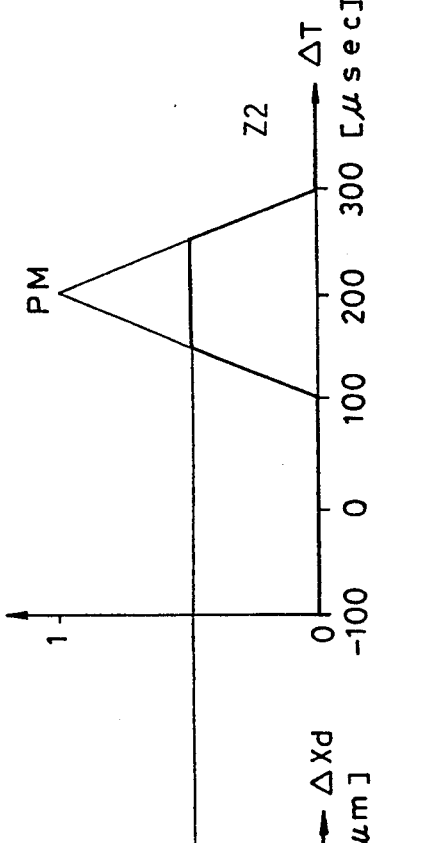
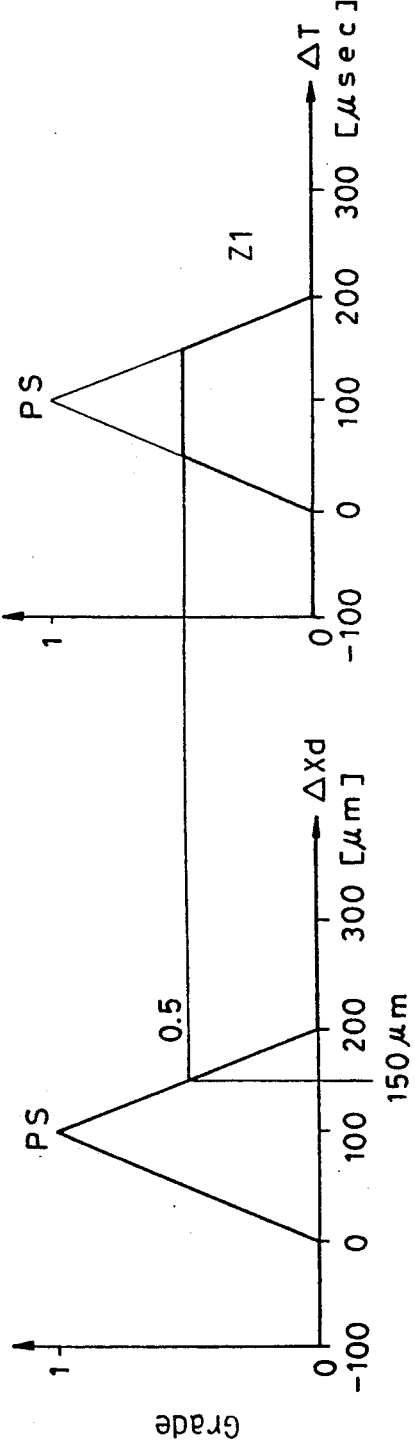
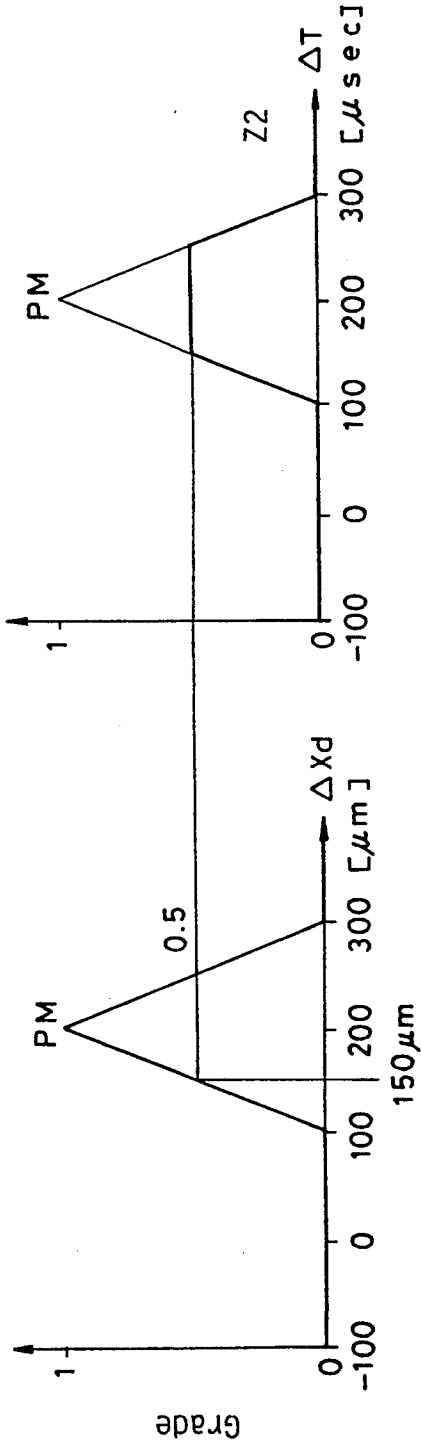
FIG. 5(a)
FIG. 5(b)

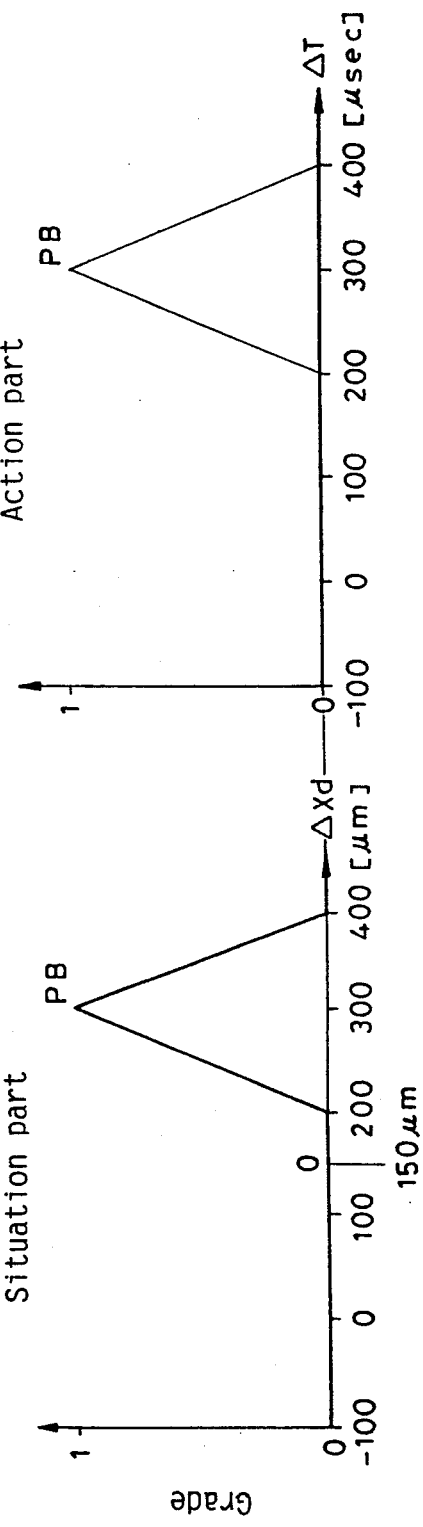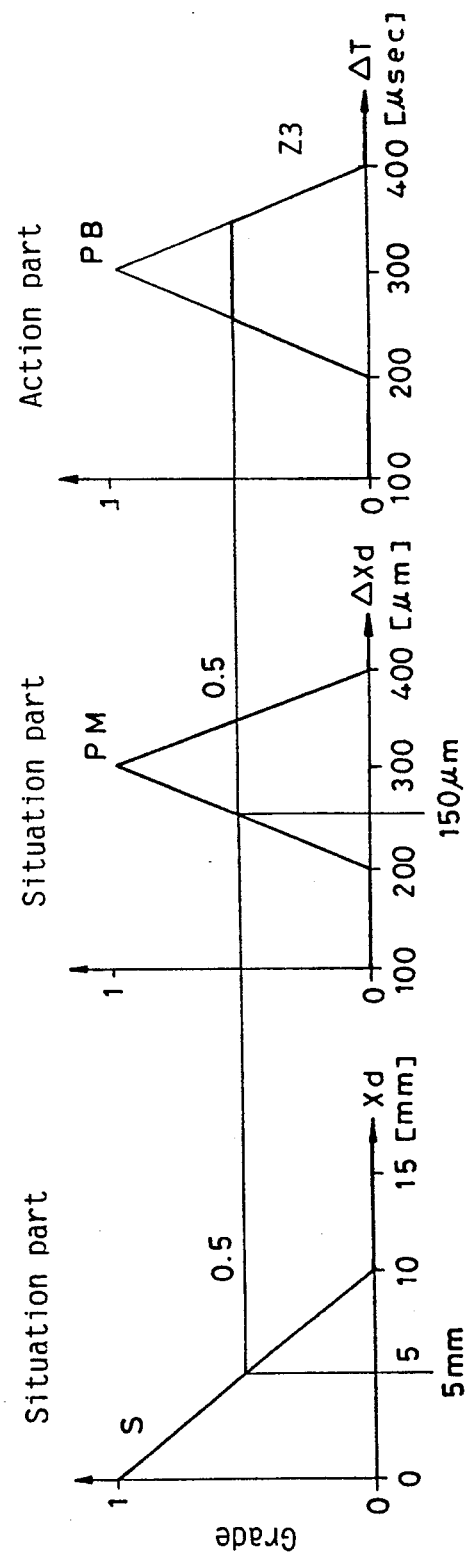

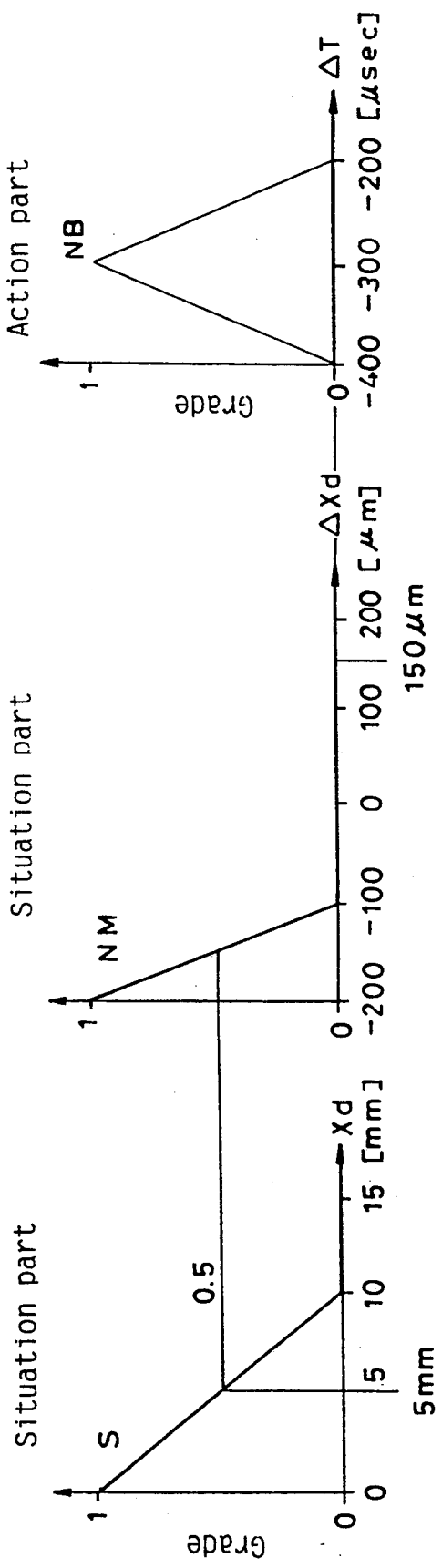
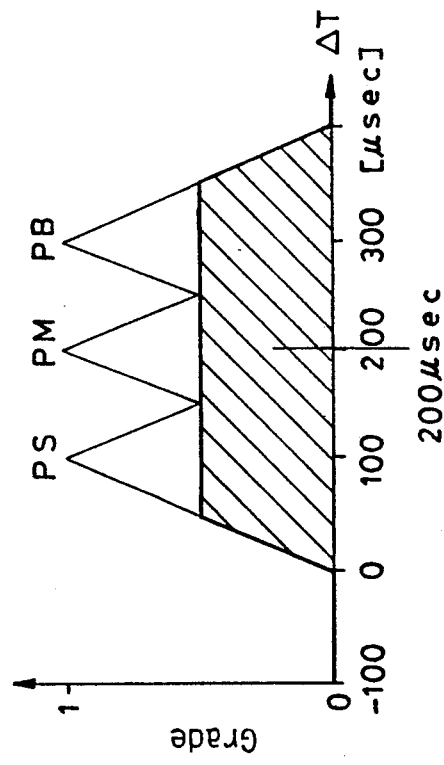
FIG. 5(e)
FIG. 5(f)

ACCESS METHOD OF ACTUATOR AND CONTROL APPARATUS THEREFOR

FIELD OF THE INVENTION AND RELATED ART STATEMENT

1. Field of the Invention

The present invention relates generally to an access method of an actuator of a disk memory apparatus and a control apparatus therefor, and more particularly to an access method of the actuator for moving it from a starting position to a predetermined target position with a high speed.

2. Description of Related Art

Recently, the recording capacity of an information recording-reproducing apparatus such as a magnetic disk apparatus or an optical disk apparatus has been significantly increased. Accordingly, improvement in the access speed of a transducer to a target track of the magnetic disk or the optical disk is required in the process of recording or reproducing data. A Bang-Bang driving method is known as an access control method of an actuator for positioning the transducer mounted on the actuator of the information recording-reproducing apparatus. This method is an open loop control system, and is a minimum time control method which applies an acceleration command and a deceleration command alternately to the actuator.

FIG. 9 is an actuator driving circuit of an access control apparatus in the prior art. Referring to FIG. 9, a Bang-Bang command signal 100 of a rectangular waveform is applied to the non-invert input (+) of an operational amplifier 101. The output of the operational amplifier 101 is amplified by a power amplifier 102 and is applied to one terminal of the magnetic coil 103 of an actuator. The other terminal of the magnetic coil 103 is grounded through a current detection resistor 106. The magnetic coil 103 has an inductance 104 and a resistance 105 which are connected in series. A counter electromotive voltage which is generated in the magnetic coil 103 is represented by a generator 107.

In the circuit, the other terminal of the magnetic coil 103 is coupled to the invert input (−) of the operational amplifier 101. Thereby the current flowing in the magnetic coil 103 is proportional to the input voltage at the non-invert input (+) of the operational amplifier 101, and constant current operation is realized within a linear operation range of the driving circuit. On the other hand, in the event that a sufficiently large input voltage is applied to the non-invert input (+) of the operational amplifier 101 such as the Bang-Bang signal 100 shown in FIG. 9, the operational amplifier 101 is saturated, and the driving circuit attains an open loop status. Consequently, transistors 102A and 102B become alternately conducting, and power source voltages +Ve and −Ve are alternately applied to the magnetic coil 103. This operation is a constant voltage operation.

In the constant voltage operation, the current flowing in the magnetic coil 103 is influenced by the inductance 104 and the counter electromotive voltage of the magnetic coil 103. Consequently, when the Bang-Bang command signal 100 is applied thereto the current flowing the magnetic coil 103 does not vary rapidly, owing to the influence of the inductance 104, at the rise edges 100A and 100C and the fall edge 100B. On the other hand, the counter electromotive voltage of the generator 107 increases in proportion to the moving speed of the actuator. The counter electromotive voltage serves to decrease the voltage which is applied to the magnetic coil 103 in the acceleration step of the first half (positive half cycle) of the Bang-Bang command signal 100, and serves to increase the voltage in the deceleration step of the latter half of the Bang-Bang command signal 100.

FIG. 10(a) is a diagram representing a current I which flows in the magnetic coil 103, FIG. 10(b) is a diagram representing the travel speed V of the actuator, and FIG. 10(c) is a diagram representing the travel distance X of the actuator. Abscissa of each diagram is graduated by time. Referring to FIGS. 10(a), 10(b) and 10(c), when the operation of the actuator is not influenced by the inductance 104 and the counter electromotive voltage, each diagram is illustrated by a dotted line, and when the operation of the actuator is influenced by the inductance 104 and the counter electromotive voltage, each diagram is illustrated by a solid line.

First, when the operation of the actuator is not influenced by the inductance 104 and the counter electromotive voltage, the travel speed V of the actuator is evaluated by an integral of the current I, and the travel distance X is also evaluated by the double-integral of the current which is applied to the actuator. Consequently, an acceleration time length, and a deceleration time length in which the actuator is accelerated or decelerated, are calculated according to the travel speed V and the travel distance X at predetermined acceleration and deceleration which are given by the amplitude of the BangBang command signal 100. On the contrary, when the operation of the actuator is influenced by the inductance and the counter electromotive voltage, it is very difficult to infer the acceleration time and the deceleration time with high precision so that the travel speed V becomes zero at a target position of the actuator. This difficulty is due to the non-linear characteristic of the inductance and the counter electromotive voltage. Consequently, an access control apparatus with a high precision and a high speed is not realizable by the Bang-Bang driving method in the prior art.

OBJECT AND SUMMARY OF THE INVENTION

An object of the present invention is to provide an access method of an actuator of a disk memory apparatus and a control apparatus therefor which realizes high speed access of the actuator with high precision.

The access method of the actuator in accordance with the present invention comprises the steps of:

accessing the actuator by an access command signal including data of an acceleration, an acceleration time, a deceleration and a deceleration time of the actuator, to move the actuator by a predetermined moving distance, and compensating the access command signal on the basis of fuzzy inference calculation of plural rules comprising
  at least one input variable of an enumeration function based on the predetermined moving distance and the shift distance between the moving distance and the moved distance of the actuator, and
  at least one output variable having a compensation value of the data of the access command signal.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 4(a), 4(b) and 4(c) are diagrams of examples of membership functions in the embodiment;

FIGS. 5(a), 5(b), 5(c), 5(d), 5(e) and 5(f) are diagrams representing the calculation process based on fuzzy inference calculation;

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
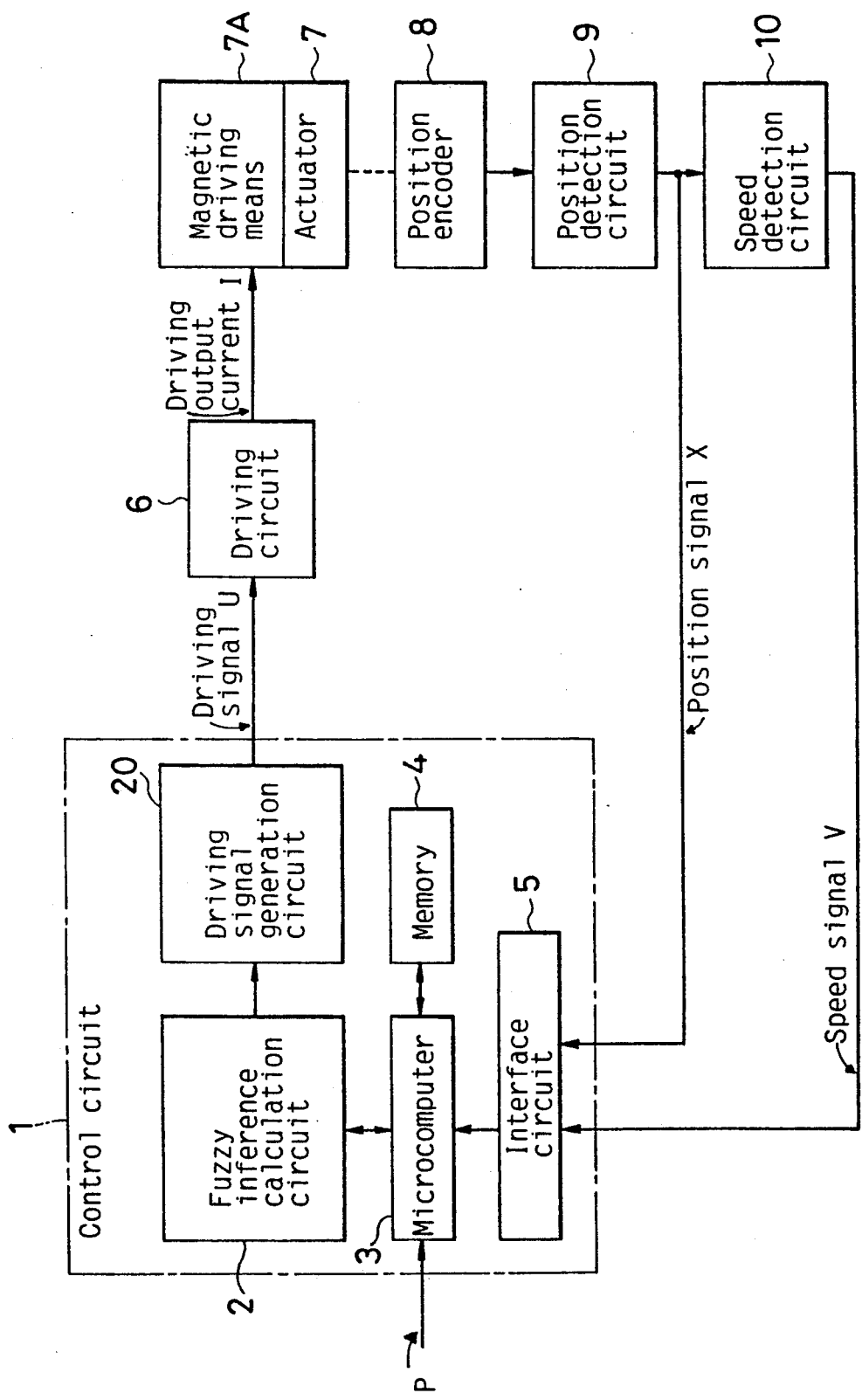
FIG.1 is a block diagram of a control apparatus for realizing an access method of an actuator of an embodiment in accordance with the present invention.

FIG.1 is a circuit block diagram of an access control apparatus of an actuator of an embodiment in accordance with the present invention. Referring to FIG.1, a recording-reproducing transducer of an information recording-reproducing apparatus such as an optical disk is mounted on an actuator 7 which is moved by a magnetic driving means 7A. The actuator 7 is moved in compliance with a driving signal U, and the transducer is positioned on a predetermined track of the optical disk, for example.

The position of the actuator 7 is detected by a position encoder 8 and a position detection circuit 9, and a position signal X is output. Moreover, a moving speed of the actuator 7 is detected by a speed detection circuit 10 on the basis of the position signal X, and a speed signal V is output. A control circuit 1 controls the action of the actuator 7 in compliance with an access command signal P which is inputted from an apparatus such as a computer located externally to the access control apparatus. The control circuit 1 comprises a fuzzy inference calculation circuit 2, the function of which will become apparent from the detailed description given hereinafter, a microcomputer 3, a memory 4, an interface 5 and a driving signal generation circuit 20.

The driving signal generation circuit 20 is an analog switch, for example, and a driving signal U including data of acceleration, an acceleration time, deceleration and a deceleration time of the actuator 7 is applied to the driving circuit 6. Accordingly, a driving output current I is supplied to the actuator 7. The driving signal U is a rectangular bipolar signal, for example, and is similar to the Bang-Bang command signal 100 in the prior art. The actuator 7 is accelerated in the first half of the driving signal U and is decelerated in the latter half thereof. The acceleration and deceleration of the actuator 7 depends on the amplitude of the driving signal U.

The interface circuit 5 comprises an A/D converter (not shown), and the position signal X and speed signal V are converted into digital signals and are applied to the microcomputer 3.

The access command signal P has data of a starting position, a target position and a moving direction of the actuator 7, for example, and is input by the microcomputer 3. The memory 4 temporarily memorizes various data.

Figure 2:
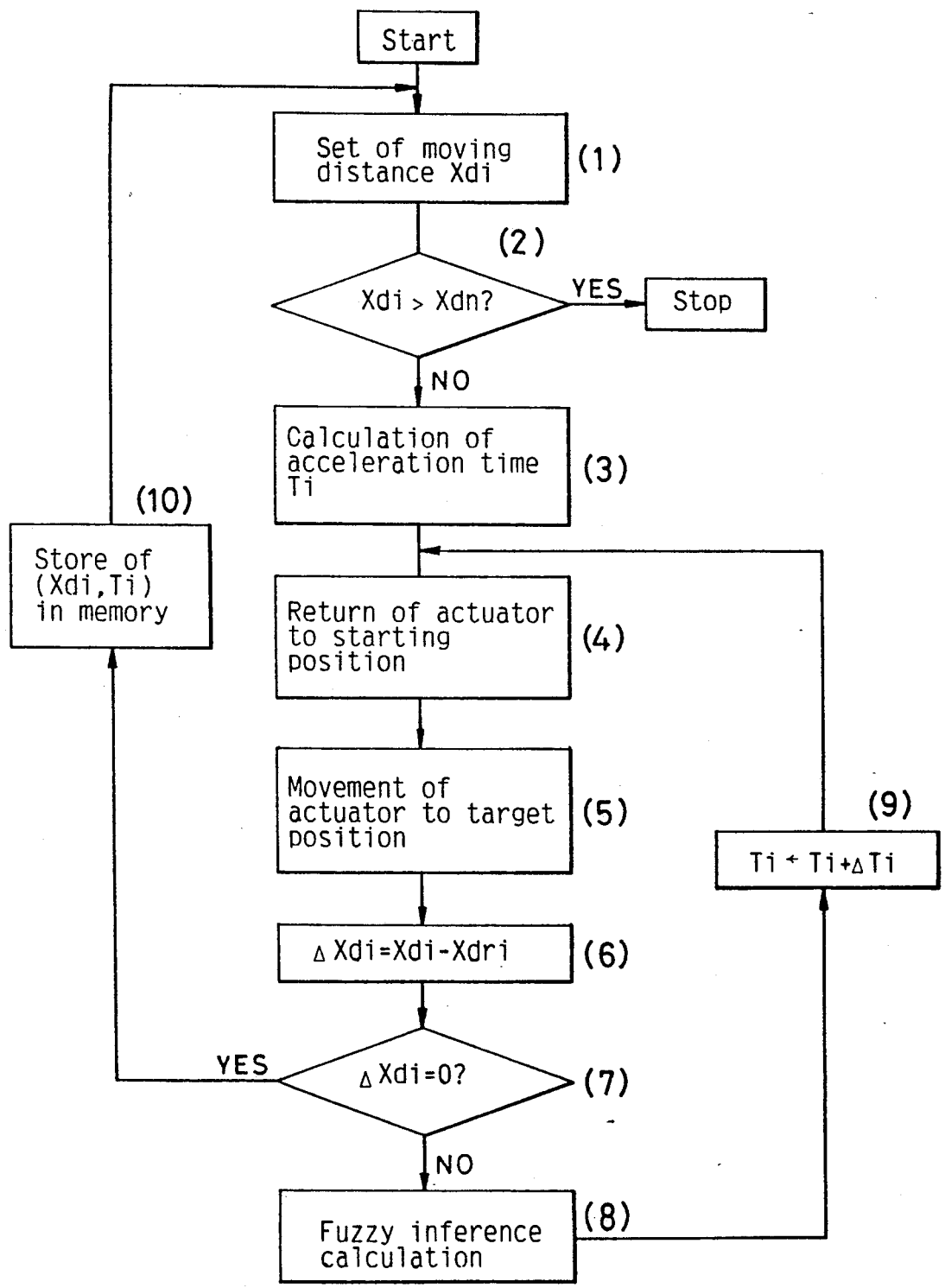
FIG.2 is a flow chart of the embodiment of the access method of the actuator in accordance with the present invention.

FIG.2 is a flow chart of an embodiment of the access method of an actuator in accordance with the present invention. The process shown by the flow chart is performed in a factory prior to delivery of the access control apparatus to a customer or prior to use by a customer.

A moving range of the actuator 7 is predetermined in accordance with a recording area of an information recording medium and is designated as a "maximum moving distance Xmax". A distance between a starting position of the actuator 7 (one end of the above-mentioned moving range, for example) and a target position appointed by an access command is defined as a "moving distance Xd". The range of the moving distance Xd is given by $$0 \leq Xd \leq Xmax \qquad (1)$$

Subsequently, the maximum moving distance Xmax is divided into (n+1) segments of distance as shown below:

$$Xd0, Xd1, Xd2, \ldots Xdi, \ldots Xdn,$$

(n: natural number).

Figure 3:
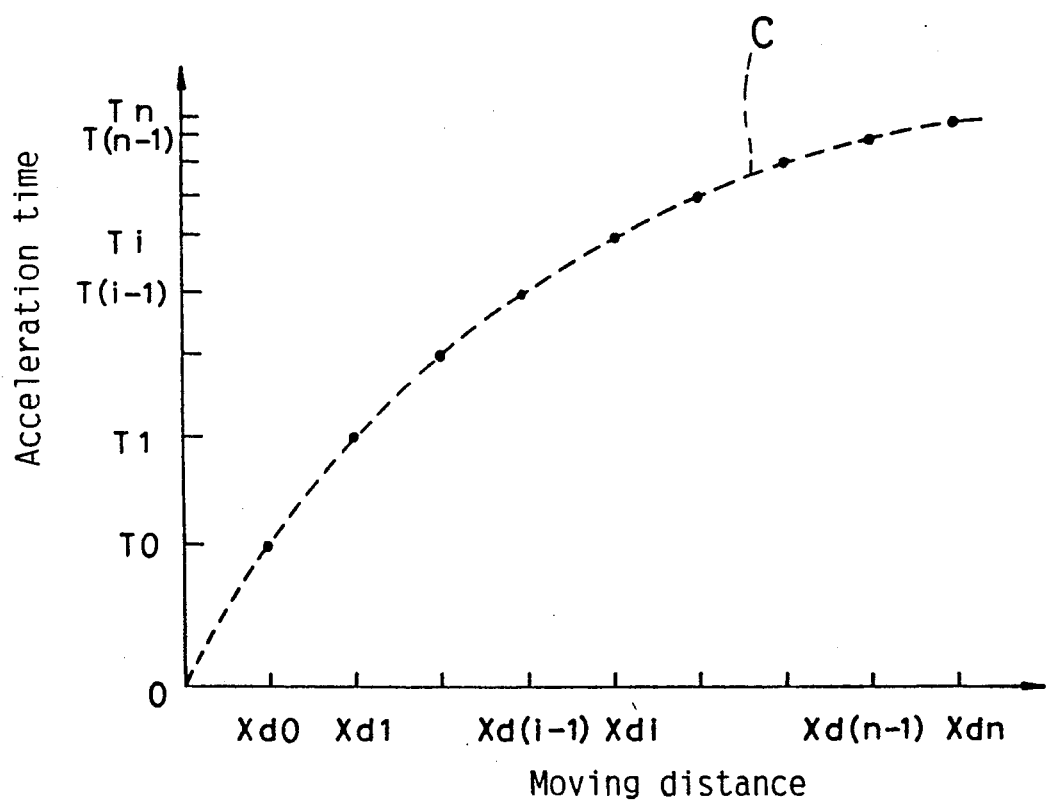
FIG.3 is a graph representing a relation between a travel distance and an acceleration time of the actuator in the embodiment.

Referring to FIG.3, the abscissa is graduated by the moving distances divided into the segments as mentioned above (Step 1 in the flow chart shown in FIG.2).

An acceleration time Ti in which the actuator 7 is accelerated to move it to a position of a distant segment Xdi is calculated by the known equation (2), $$Ti = (2 \cdot Xdi/a)^{\frac{1}{2}} \qquad (2)$$

where, the acceleration of the actuator 7 is represented by "$a$" (Step 3). The acceleration time Ti obtained by the relation (2) is a theoretical value, and the influence of a counter electromotive voltage due to an inductance of the magnetic driving means 7A is not taken into account. After termination of the acceleration time Ti, the actuator 7 is decelerated in the latter half of the driving signal U and stops at a position. Therefore, in order to shift the actuator to a target position, an optimum acceleration time must be selected.

The optimum acceleration time will be obtained by trial operation of the actuator 7 on the basis of the acceleration time Ti calculated by the equation (2). The trial operation of the actuator 7 is started with respect to a first segment between the starting position "0" and the distance Xd0 shown in FIG.3.

First, the actuator 7 is returned to the starting position "0" (Step 4). The "starting position" is a position at which the actuator 7 stays after the preceding access operation or one end of the moving range. Then the actuator 7 is accelerated to move to the position of the moving distance Xd0 during the acceleration time T0, and after termination of acceleration time the actuator 7 is decelerated. Consequently, the actuator 7 stops at a position. A "shift distance Xdr0" which is defined as the distance measured between the starting position "0" and the position at which the actuator 7 stops. Then, a "distance variation ΔXd0" which is a difference between the moving distance Xd0 and the shift distance Xdr0 is calculated by the relation (3) (Step 6).

$$\Delta Xd0 = Xd0 - Xdr0 \qquad (3).$$

When the distance variation ΔXd0 is sufficiently small (the value will be shown hereafter) (Step 7), the acceleration time T0 and the moving distance Xd0 are memorized in the memory 4 (Step 10).

On the other hand, when the distance variation ΔXd0 is not so small, a "compensation time ΔT0" for correcting the acceleration time T0 is evaluated by a fuzzy inference method which will be described hereafter (Step 8). Subsequently, the compensation time ΔT0 is added to the acceleration time T0 as shown by the relation (4), and new acceleration time T02 is calculated (Step 9).

$$T02 = T0 + \Delta T0 \qquad (4).$$

Subsequently, the actuator 7 is returned to the starting position "0", and the actuator 7 is moved again to the position of the moving distance Xd0 during the acceleration time T02 (Steps 4, 5). The above-mentioned Steps 4, 5, 6, 7, 8 and 9 are repeated until the distance variation ΔXd0 becomes substantially zero. When the distance variation ΔXd0 is substantially equal to zero, an acceleration time T0 with respect to the moving distance Xd0 is determined, and the date (Xd0, T0) including the moving distance Xd0 and the acceleration time T0 is memorized in the memory 4 (Step 10).

The above-mentioned process of Steps 1–10 is applied to entire moving distances Xd0, Xd1, Xd2, ... Xdi ... Xdn in turn, and data (Xd1, Ti) (i=0, 1, 2, ... n) of n+1 of number are obtained. The data (Xdi, Ti) are memorized in the memory 4. The data (Xdi, Ti) are shown in FIG.3. Referring to FIG.3, abscissa is graduated by the moving distance Xdi, and the ordinate graduated by the acceleration time Ti.

In the above-mentioned operation, influence of the counter electromotive voltage due to the inductance of the magnetic driving means 7A can be introduced into the data (Xdi, Ti) of the acceleration of the actuator 7. Consequently, dispersion in the characteristic of the actuator 7 also can be compensated.

The details of the fuzzy inference calculation of Step 8 in the flow chart shown in FIG.2 is described below. The fuzzy inference calculation is performed by the fuzzy inference calculation circuit 2 in FIG.1. Basic inference rules are shown as follows:
Rule 1: If ΔXd=PS, then ΔT=PS.
Rule 2: If ΔXd=PM, then ΔT=PM.
Rule 3: If ΔXd=PB, then ΔT=PB.
Rule 4: If ΔXd=NS, then ΔT=NS.
Rule 5: If ΔXd=NM, then ΔT=NM.
Rule 6: If ΔXd=NB, then ΔT=NB.
Rule 7: If ΔXd=ZR, then ΔT=ZR.
Where,
ΔXd: distance variation,
ΔT: compensation time,
PS: positive small,
PM: positive medium,
PB: positive big,
NS: negative small,
NM: negative medium,
NB: negative big,
ZR: zero.

In the above-mentioned inference rules, representation "if ΔXd=PS" is called a "situation part", and representation "then ΔT=PS" is called an "action part". Moreover, representations "PS", "PM", "PB", "NS", "NM", "NB" and "ZR" are called "fuzzy variables".

The fuzzy inference calculation is elucidated as to the Rule 1, for example. When a distance variation ΔXd is a positive small value, (the actuator 7 stops before a target position, and the distance variation between the arrived position and the target position is small), a compensation time ΔT is a positive small value as shown in the Rule 1. In a similar manner, the above-mentioned fuzzy inference calculation is applied to the rules 2–7.

According to the graph shown in FIG.3, the abscissa is graduated by the moving distance. This moving distance is divided into the same intervals between the starting position "0" and the moving distance Xdn. On the other hand, the intervals between neighboring two acceleration times Ti and Ti+1 on the ordinate are gradually decreased toward the acceleration time Tn from the acceleration time T0. The nonlinearity of the relation between the moving distance Xdi and the acceleration time Ti is the result of an actual experiment. The nonlinearity is taken into account in the fuzzy inference calculation of the embodiment, and the following four new inference rules are added to the above-mentioned seven rules:
Rule 8: If Xd=S and ΔXd=PM, then ΔT=PB.
Rule 9: If Xd=S and ΔXd=NM, then ΔT=NB.
Rule 10: If Xd=B and ΔXd=PM, then ΔT=PS.
Rule 11: If Xd=B and ΔXd=NM, then ΔT=NS.
Where,
Xd: moving distance,
S: small,
M: medium,
B: big.

The fuzzy inference calculation mentioned above is elucidated as to the Rule 8, for example. When the moving distance Xd is small (S) and the distance variation ΔXd is positive medium value (PM), the compensation time ΔT of the acceleration time T is positive big value (PB). By addition of the Rule 8, in the event that the moving distance is relatively small such as moving distance Xd0 or Xd1, a relatively large compensation time ΔT is added to the acceleration time T. In a similar manner, the Rules 9–11 are applied to corresponding cases, respectively. Consequently, the effect of the nonlinearity of the curve shown in FIG.3 is introduced into the data (Xdi, Ti).

Figure 4A:
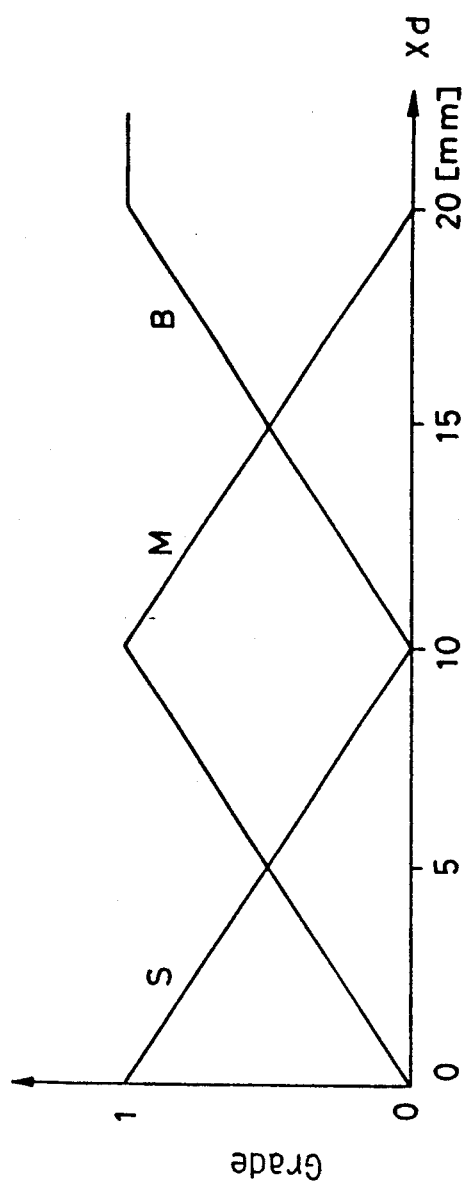
Figure 4B:
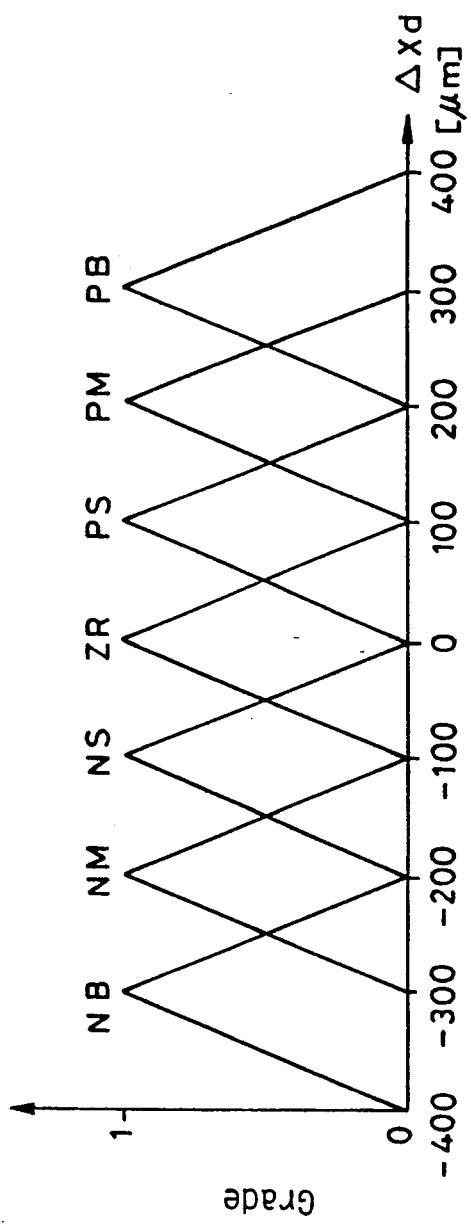

FIGS. 4(a), 4(b) and 4(c) are diagrams of membership functions with respect to the above-mentioned fuzzy variables. Referring to FIG.4(a), the abscissa is graduated by a moving distance Xd, and the ordinate is graduated by a grade. The grade takes a value from zero to one. In the embodiment, the maximum moving distance Xmax is 20 mm, and the membership functions are represented by triangles. Referring to FIG.4(b), abscissa is graduated by a distance variation ΔXd of the range from −400 μm to +400 μm. The ordinate is also graduated by the grade. Referring to FIG.4(c), abscissa is graduated by a compensation time ΔT of the range from −400 μsec to +400 μsec. The ordinate is also graduated by the grade.

FIGS. 5(a), 5(b), 5(c), 5(d), 5(e) and 5(f) are diagrams of a process of the fuzzy inference calculation in the embodiment. Referring to these figures, the moving distance Xd is 5 mm and the distance variation ΔXd is 150 μm. The fuzzy inference calculation is called the Mamdani method or MIN-MAX composition method presently known in the art.

Referring to FIG.5(a), the left diagram represents the situation part in Rule 1, and the right diagram represents the action part of the same rule. Since the distance variation ΔXd is 150 μm, the grade is 0.5 with respect to the fuzzy variable PS. Consequently, in the action part, the diagram is cut at the line of the grade 0.5. Thus the variable PS of the compensation time ΔT is represented by a trapezoid Z1.

Referring to FIG.5(b), the left diagram represents the situation part in Rule 2, and the right diagram represents the action part thereof. The grade is 0.5 in the situation part. Consequently, the diagram of the action part is cut along the line of the grade 0.5, and the variable PM of the compensation time ΔT is represented by a trapezoid Z2.

Referring to FIG.5(c), the left diagram represents the situation part in Rule 3, and the right diagram represents the action part thereof. In the situation part, since the grade is zero with respect to the fuzzy variable PB, the compensation time is not determined in the action part. Consequently, when the distance variation ΔXd is 150 μm, the Rule 3 can not be applied to the fuzzy variable PB. In a similar manner, Rules 4-7 can not be applied to the variable PB.

Referring to FIG.5(d), Rule 8 is applied to the above-mentioned fuzzy inference calculation. The Rule 8 comprises two situation parts and one action part. The left diagram represents a moving distance Xd, the central diagram represents a distance variation ΔXd and the right diagram represents a compensation time ΔT. In the situation parts, since the moving distance is 5 mm and the distance variation is 150 μm, both the grades are 0.5. Consequently, the fuzzy variable PB in the action part is represented by a trapezoid Z3.

Referring to FIG.5(e), Rule 9 is applied to the above-mentioned fuzzy inference calculation. In the Rule 9, the left diagram (situation part) represents the variable S, and the grade with respect to 5 mm of the moving distance is 0.5. The central diagram (situation part) represents the variable NM, and the grade with respect to 150 μm of the distance variation is zero. Consequently, the grade in the action part with respect to the variable NB results in zero. Consequently, the Rule 9 can not be applied to the case. In a similar manner Rules 10 and 11 can not be applied to the situation.

Referring to FIG.5(f), the diagram of a hatched part represents the membership functions int eh action parts on which he results of the fuzzy calculation with respect to the entire rules from Rule 1 to Rule 11 are represented by means of the MIN-MAX composition method. In order to defuzzify the results, the center of gravity of the hatched part is determined. In the example shown in FIG.5(f), 200 μsec of compensation time ΔT is obtained from the center of gravity.

The compensation time ΔT (200 μsec in this case, for example) is added to the acceleration time Ti ($T = Ti + \Delta T$), and new acceleration time T is calculated.

In the embodiment, the driving signal U is a rectangular bipolar signal, and the amplitude of the driving signal U which is applied to the actuator 7 in the acceleration step is identical with that in the deceleration step, but these amplitudes can be selected arbitrarily. In such case, a compensation amplitude ΔD for an acceleration step or a deceleration step is usable for the variable of the action part of a fuzzy inference calculation. An example of such a rule having the action part of the compensation amplitude ΔD is shown below, If Xd=S and ΔXd=PM, then ΔD=PB.

Moreover, in the embodiment, a compensation time which compensates a deceleration time is usable as replacement for the compensation time ΔT of the acceleration time T for the variable in the action part. Furthermore, a pause in the moving operation of the actuator 7 can be interposed between the acceleration step and deceleration step.

As mentioned above, the optimum acceleration time Ti is obtained with respect to a moving distance Xdi shown by the graph of FIG.3. However, the moving distance Xdi merely represents discrete positions which divides the maximum moving distance Xmax into (n+1) segments of the moving distance Xdi. For instance, in order to move the actuator to a position between both the positions of the moving distances Xd2 and Xd3, an acceleration time T which is larger than the acceleration time T2 and is smaller than the acceleration time T3 must be selected. In the embodiment, the optimum acceleration time T with respect to any moving distance Xd can be obtained by applying "interpolation operation" to the discrete moving distance.

Figure 6A:
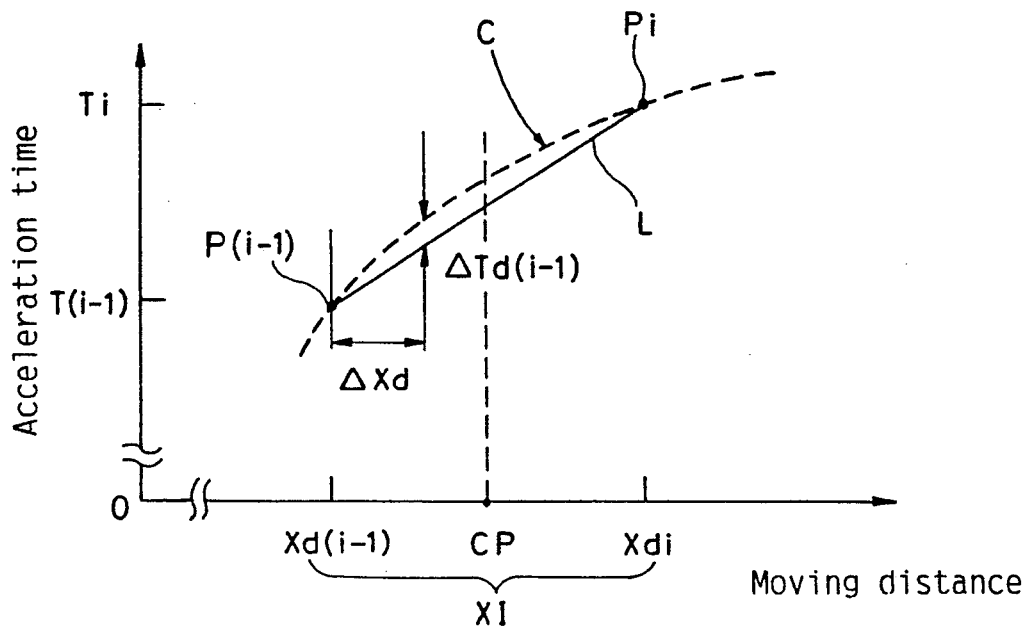
FIGS. 6(a), 6(b) and 6(c) are graphs representing enlarged parts of the graph shown in FIG.3.
Figure 6B:
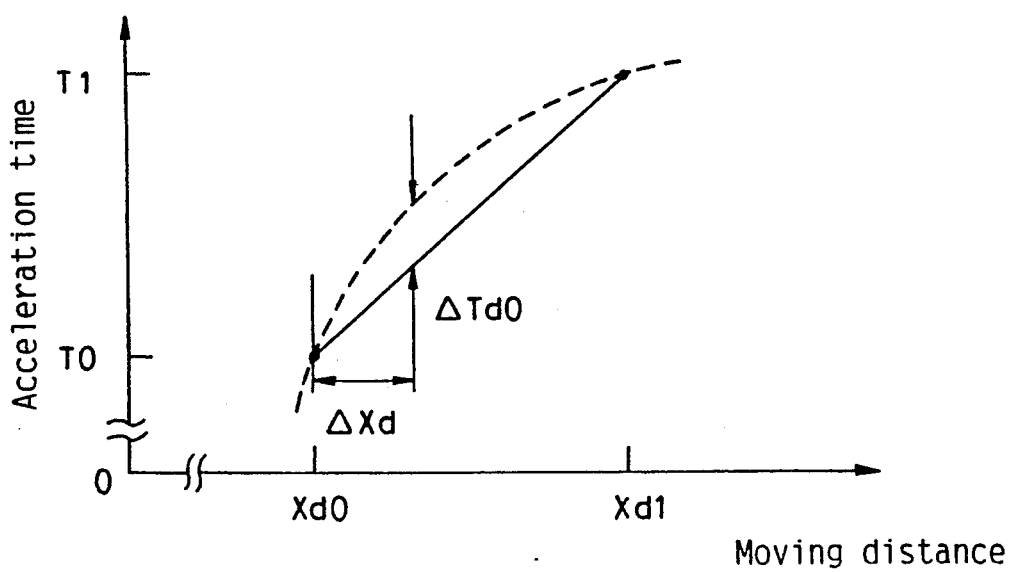
Figure 6C:
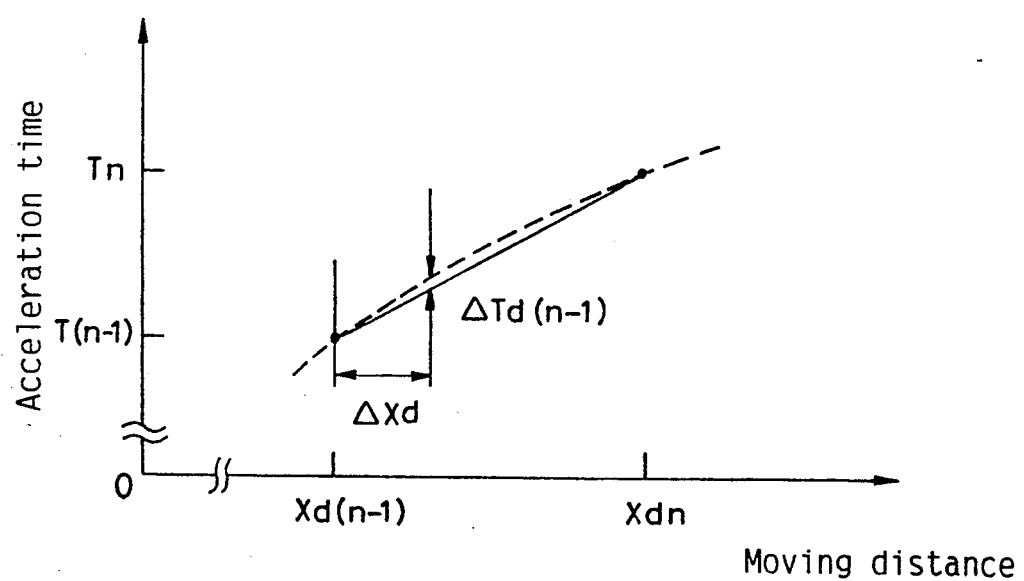

FIGS. 6(a), 6(b) and 6(c) are graphs of enlarged parts of the graph shown in FIG.3. Referring to FIG.6(a), the moving distances Xd(i−1) and Xdi are illustrated with acceleration times T(i−1) and Ti. When the position of a moving distance Xd which is targeted is present between both the positions of the moving distances Xd(i−1) and Xdi, the interpolation acceleration time Td with respect to the moving distance Xd is represented by equation (5)

$$Td = \frac{Ti - T(i-1)}{Xdi - Xd(i-1)} \times (Xd - Xd(i-1)) + T(i-1). \qquad (5)$$

The linear interpolation given by the equation (5) interpolates with a straight line L between the intersections P(i−1) and Pi of the coordinates of the moving distances Xd(i−1) and Xdi and the coordinates corresponding acceleration times T(i−1) and Ti. However, the relation between the moving distance Xdi and the acceleration time Ti is defined by a curve C shown by a dotted line. Therefore, the optimum result is not realizable only by linear interpolation.

In the present invention, an interpolation operation is applied to correct the result of the linear interpolation, and an optimum acceleration time lying on the curve C of the graph of FIG.3 is obtainable.

FIG.6(a) is a diagram of the central part of the curve C shown in FIG.3 on an enlarged scale (central part of the moving range of the actuator 7), FIG.6(b) is a diagram adjacent to the starting position of the actuator 7 on an enlarged scale, and FIG.6(c) is a diagram adjacent to the maximum moving distance of the actuator 7 on an enlarged scale. Referring to these figures, the solid line represents the resultant oblique straight lines of the linear interpolation, and curves of the dotted line represent accurate relation between the moving distance Xd and the acceleration time T. Therefore, a vertical difference between the curve and the oblique straight line represents an interpolation time $\Delta Tdi$ which is an interpolation error of the acceleration time T. The interpolation time $\Delta Tdi$ varies in compliance with the moving distance Xdi. For example, the maximum interpolation time $\Delta Td0$ in the segment shown in FIG.6(b) is larger than the maximum interpolation time $\Delta Td(i-1)$ in the segment shown in FIG.6(a), and the maximum interpolation time $\Delta Td(n-1)$ in the segment shown in FIG.6(c) is smaller than the interpolation time $\Delta Td(i-1)$. The above-mentioned size relation is given by:

$$\Delta Td(n-1) < \Delta Td(i-1) < \Delta Td0 \qquad (6).$$

Referring to FIG.6(a), in interpolation of the interval XI between both the positions of the moving distances $Xd(i-1)$ and Xdi, the position at which an interpolation time $\Delta Td$ is maximum is present adjacent to the center of the interval XI. Therefore, the interpolation time $\Delta Td$ is not in proportion to the moving distance Xd. Consequently, if the interpolation operation is performed with reference to one of the moving distance $Xd(i-1)$ and Xdi, the number of Rules undesirably increases in the fuzzy inference calculation.

It is preferable to reduce the number of Rule in the fuzzy inference calculation. In the embodiment, the number of Rule is reduced by the following method;

First, the interval XI is divided into two parts, and the midpoint CP of the interval XI is determined. Then, the interpolation operation is performed with reference to the moving distance $Xd(i-1)$ when the target position lies between the position of the moving distance $Xd(i-1)$ and the midpoint CP. The target position is then represented by $[Xd(i-1)+\Delta Xd]$. Moreover, the interpolation operation is performed with reference to the moving distance Xdi when the target position lies between the midpoint CP and the position of the moving distance Xdi. The target position is then represented by $[Xdi+\Delta Xd]$. Consequently, the difference variation $\Delta Xd$ has a positive value in the first half of the interval XI, and has a negative value in the latter half thereof. Thus, the absolute value of a distance variation $\Delta Xd$ ($|\Delta Xd|$) is used in the fuzzy inference calculation of the interpolation operation. The above-mentioned operation is performed by the control circuit 1.

The interpolation time $\Delta Tdi$ is evaluated by means of a fuzzy inference calculation as follows. In the fuzzy inference calculation, input variables are the moving distance Xd and a distance variation $\Delta Xd$ which is to be added to the moving distance Xd to interpolate the moving distance Xd, and an output variable is the interpolation time $\Delta Td$. An interpolated acceleration time T is obtained by adding the interpolation time $\Delta Td$ to an acceleration time Td. The implicational rules of the fuzzy inference calculation are shown below.

Rule A: If Xd=S and $|\Delta Xd|$=S, then $\Delta Td$=M.
Rule B: If Xd=S and $|\Delta Xd|$=M, then $\Delta Td$=B.
Rule C: If Xd=S and $|\Delta Xd|$=B, then $\Delta Td$=VB.
Rule D: If Xd=M and $|\Delta Xd|$=S, then $\Delta Td$=S.
Rule E: If Xd=M and $|\Delta Xd|$=M, then $\Delta Td$=M.
Rule F: If Xd=M and $|\Delta Xd|$=B, then $\Delta Td$=B.
Rule G: If Xd=B and $|\Delta Xd|$=S, then $\Delta Td$=VS.
Rule H: If Xd=B and $|\Delta Xd|$=M, then $\Delta Td$=S.
Rule I: If Xd=B and $|\Delta Xd|$=B, then $\Delta Td$=M.

The meaning of the fuzzy variables in the implicational rules are follows:
S: small,
M: medium,
B: big,
VS: very small,
VB: very big.

In FIG.6(a), since the moving distance Xd and the distance variation $\Delta Xd$ have medium values (M), it is preferable for the interpolation time $\Delta Td$ of an interpolation acceleration time Td to select a medium value (M). Consequently, the Rule E is applied thereto.

In FIG.6(b), since the moving distance Xd is small (S) and the distance variation $\Delta Xd$ is medium (M), it is preferable for the interpolation time $\Delta Td$ of the interpolation acceleration time Td to select a big value (B). Consequently, the Rule B is applied thereto.

Moreover, in FIG.6(c), since the moving distance Xd is large (B) and the distance variation $\Delta Xd$ is medium (M), it is preferable for the interpolation time $\Delta Td$ of the interpolation acceleration time Td to select a small value (S). Consequently, the Rule H is applied thereto. By a similar criterion mentioned above, preferable rules should be selected for various cases.

Figure 7A:
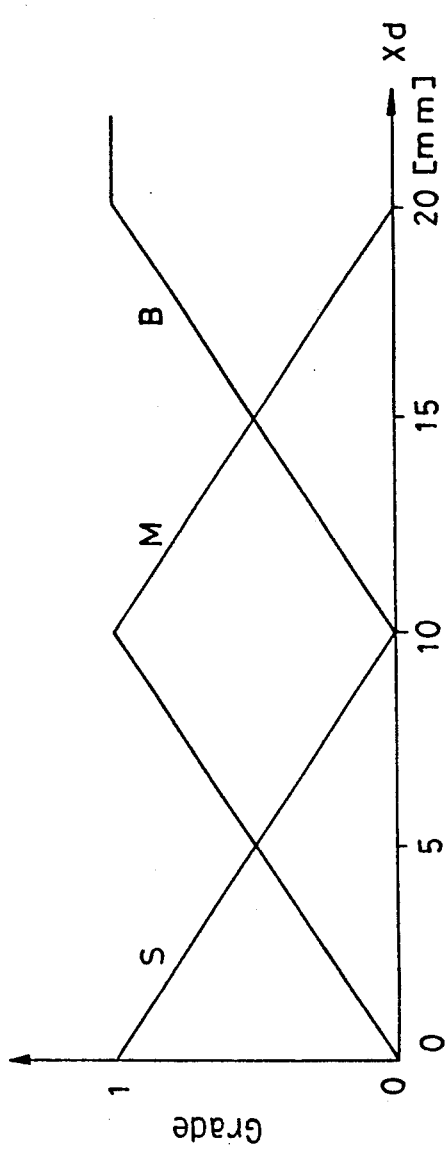
FIGS. 7(a), 7(b) and 7(c) are diagrams of examples of membership functions in the embodiment.
Figure 7B:
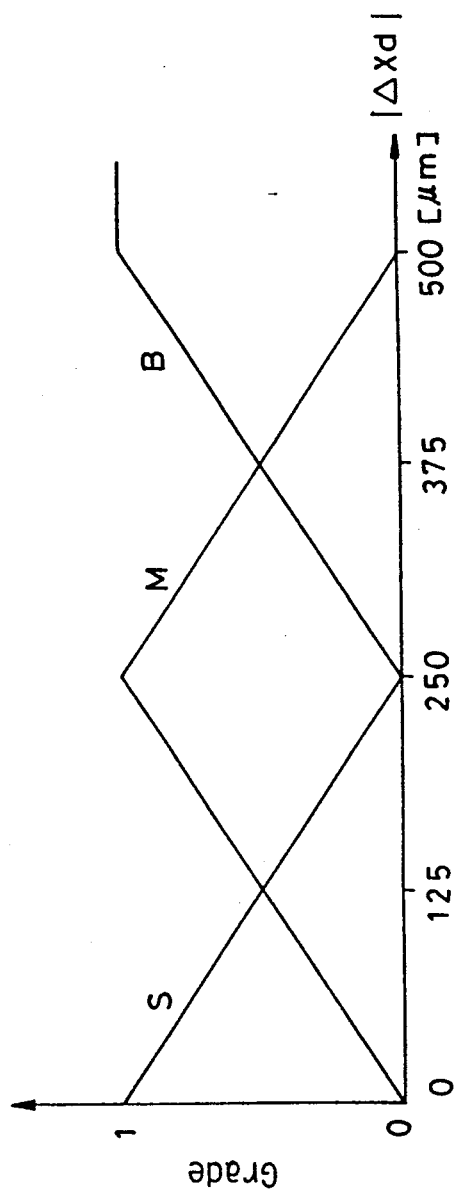
Figure 7C:
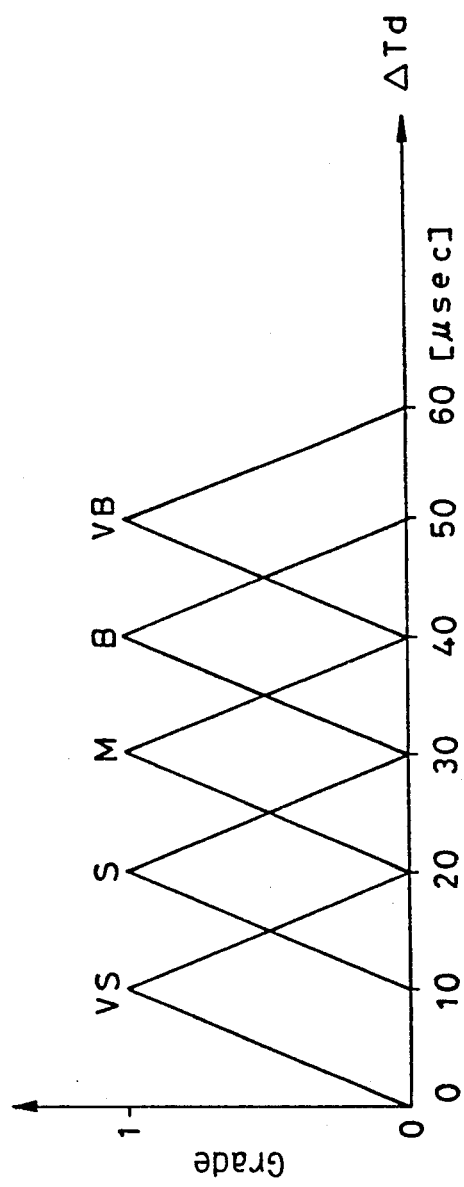

The diagrams shown by FIGS. 7(a), 7(b) and 7(c) are examples of membership functions with respect to the fuzzy variables. Ordinates are graduated by the grade between zero and one. Abscissas in FIGS. 7(a), 7(b) and 7(c) are graduated by the moving distance Xd, the absolute value of the distance variation $\Delta Xd$ and the interpolation time $\Delta Td$, respectively.

The fuzzy inference calculation by means of the membership functions shown in FIGS. 7(a), 7(b) and 7(c) are similar to those described hereinabove with reference to FIGS. 5(a)–5(f).

The interpolation time $\Delta Td$ calculated as mentioned above is added to the interpolation acceleration time Td ($T=Td+\Delta Td$), and an accurate acceleration time T is evaluated. Then the actuator 7 is controlled by the acceleration time T, and is accurately shifted to a target position.

In the embodiment, the two points $P(i-1)$ and Pi shown in FIG.6(a), for example, are basically interpolated by a straight line L. Moreover, as replacement for the linear interpolation by the straight line L, the known Lagrange interpolation method is applicable thereto. In the event that such interpolation method is applied, other fuzzy inference rules and fuzzy functions may be selected accordingly.

The fuzzy variable in the embodiment can be defined by an enumeration function of the moving distance Xd such as $Xd^{\frac{1}{2}}$. In this case, an example of the rule is represented as follows:

If $Xd^{\frac{1}{2}}$=S and $\Delta Xd$=PM, then $\Delta T$=PB. According to the example of the rule, linear relation between the acceleration time T and the moving distance $Xd^{\frac{1}{2}}$ is obtainable. The linear relation makes easy definition of membership functions.

A combination of the moving distance Xd and an enumeration function of the moving distance Xd is usable for the fuzzy variable int he embodiment. An example of the rule by means of the combination is as follows:

If $Xd+log(Xd)$=S and $\Delta Xd$=PM, then $\Delta T$=PB.

In the above-mentioned example, linear relation between the acceleration time T and the combination $Xd+log(Xd)$ is realizable. Consequently, definition of membership functions ar simplified.

Figure 8:
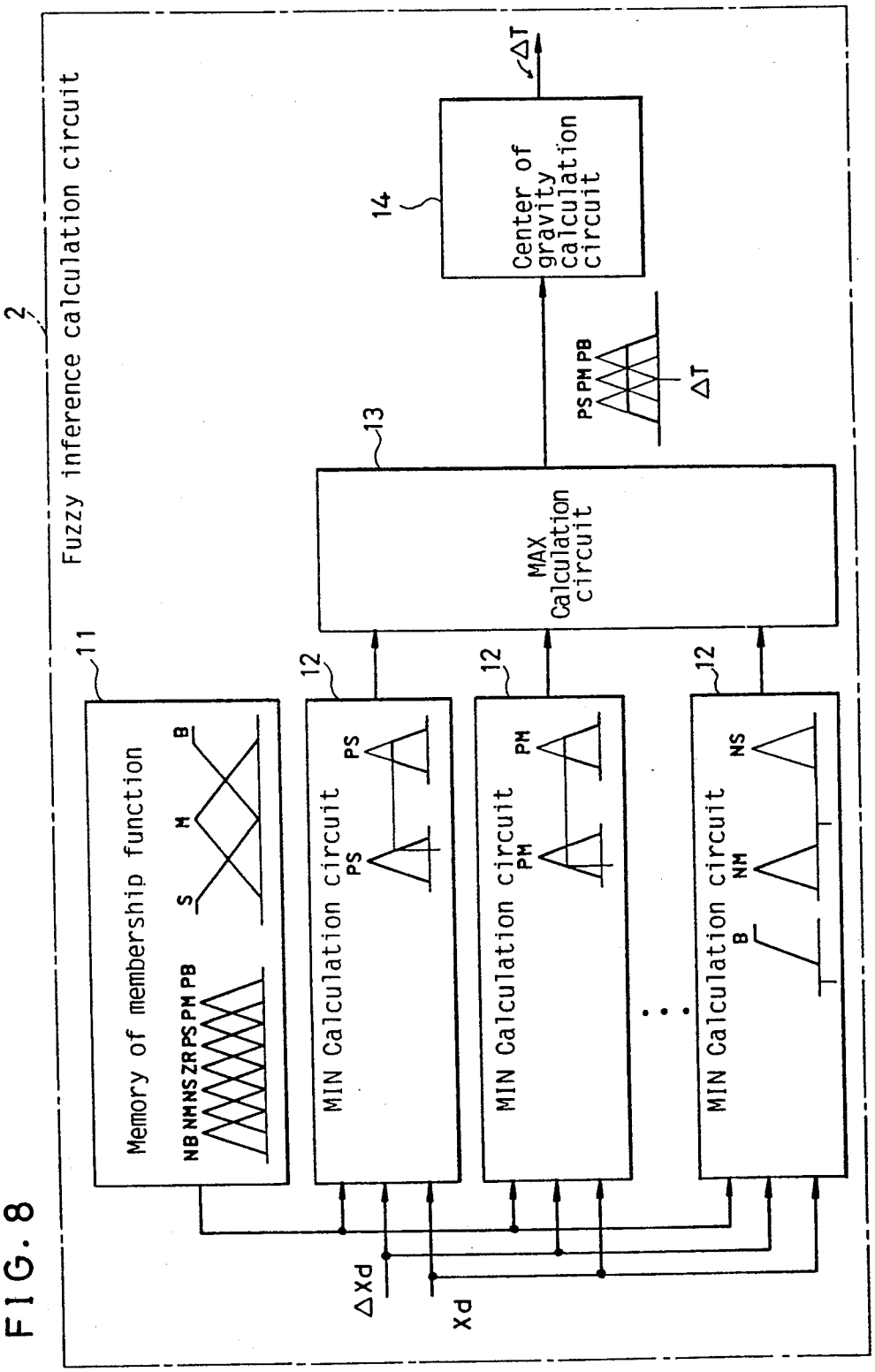
FIG.8 is a block diagram of a fuzzy inference calculation circuit in the embodiment.
Figure 9:
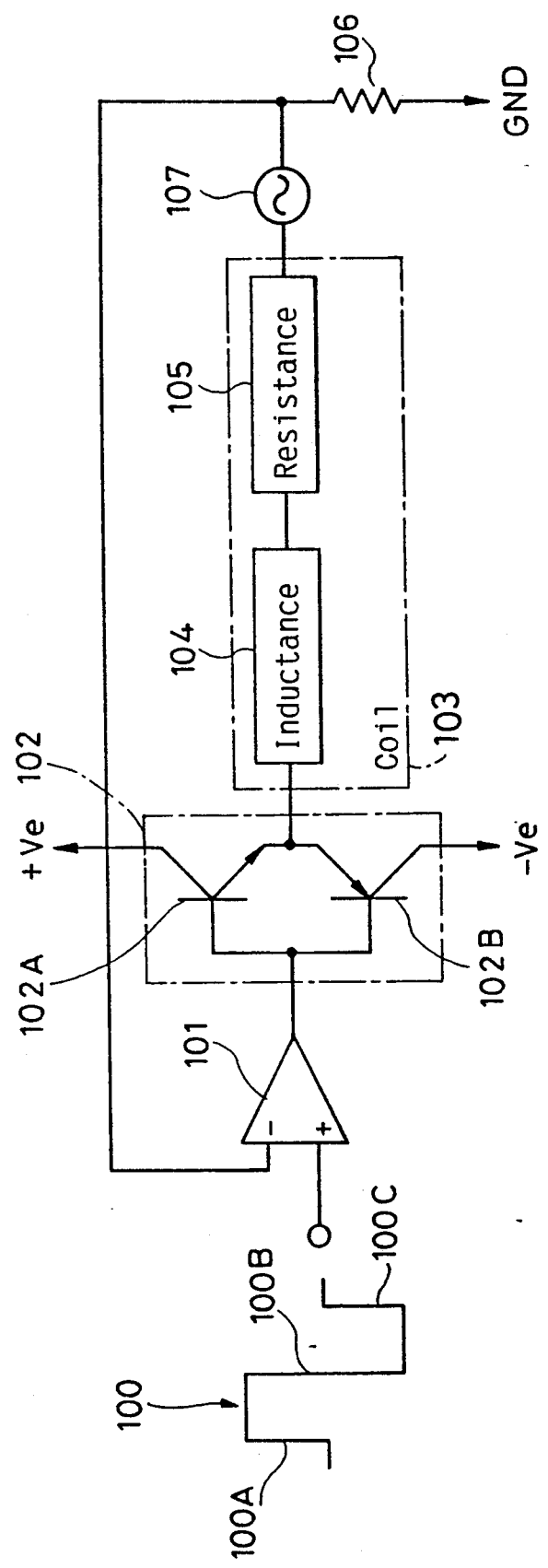
FIG.9 is the block diagram of the actuator driving circuit of the access control apparatus in the prior art.
Figure 10A:
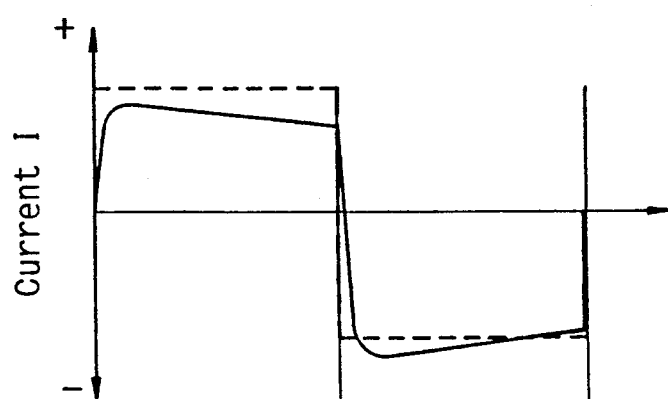
FIG.10(a) is the waveform of the input Bang-Bang command signal.
Figure 10B:
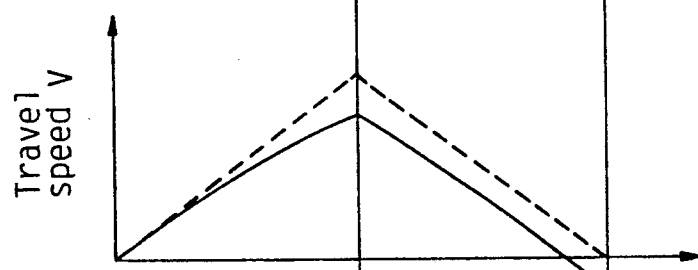
FIG.10(b) is the graph of the relation between the travel speed and the time.
Figure 10C:
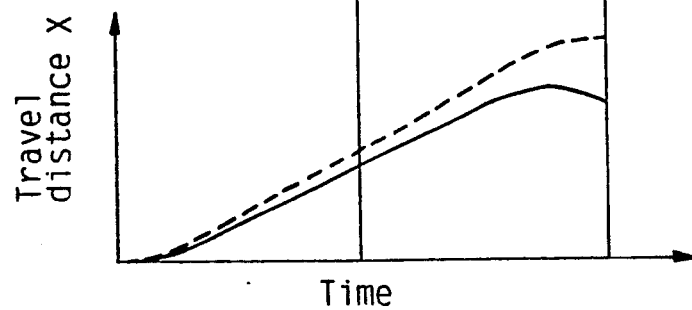
FIG.10(c) is the graph of the relation between the travel distance and the time.

FIG.8 is a block diagram of a fuzzy inference calculation circuit 2 in the embodiment. Referring to FIG.8, a membership function memory 11 stores predetermined membership functions. A MIN calculation circuits 12.1, 12.2, ... 12.n comprise memories for storing rules of the fuzzy inference calculation, and serve to calculate situation parts and action parts thereof. The number of the MIN calculation circuits 12.i (i=1, 2, ... n) is equal to those of the rules. The output of the MIN calculation circuits 12.i is applied to a MAX calculation circuit 13. In the MAX calculation circuit 13, an intersection of sets of the membership functions in the action parts is calculated on the basis of the data from the entire MIN calculation circuits 12.i, and resultant data is inputted to a center of gravity calculation circuit 14. In the center of gravity calculation circuit 14, the center of gravity of the intersection of sets is calculated.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is

1. A method for initializing an actuator controller using fuzzy logic, the method comprising the steps of:
   dividing a predetermined moving range of said actuator into a plurality of segments having equal length, a beginning of each segment defining a different discrete segment distance from a starting point;
   determining compensated drive signals corresponding to each segment distance for moving said actuator a segment distance, the determining of a compensated drive signal for a segment distance comprising the steps of,
   calculating a drive signal which includes data of at least one of acceleration, acceleration time, deceleration, and deceleration time of said actuator to move said actuator a segment distance,
   driving said actuator using said calculated drive signal,
   measuring as a shift distance, a distance said actuator moved in response to said calculated drive signal,
   producing a compensation value by means of a fuzzy inference calculation based on said segment distance and said shift distance, and
   compensating said calculated drive signal using said compensation value to produce a compensated drive signal for moving said actuator said segment distance; and
   storing each of said compensated drive signals for driving said actuator during operation.

2. The method as in claim 1, wherein a distance variation is calculated by subtracting said shift distance from a segment distance, and said compensation value is produced by means of a fuzzy inference calculation based on said distance variation.

3. The method as in claim 1, wherein the compensation value is at least one of acceleration, acceleration time, deceleration, and deceleration time.

4. A method for initializing an actuator controller and performing control therewith using fuzzy logic, the method comprising the steps of:
   dividing a predetermined moving range of said actuator into a plurality of segments having equal length, a beginning of each segment defining a different discrete segment distance from a starting point;
   determining compensated drive signals corresponding to each segment distance for moving said actuator a segment distance, the determining of a compensated drive signal for a segment distance comprising the steps of,
   calculating a drive signal which includes data of at least one of acceleration, acceleration time, deceleration, and deceleration time of said actuator to move said actuator a segment distance,
   driving said actuator using said calculated drive signal,
   measuring as a shift distance, a distance said actuator moved in response to said calculated drive signal,
   producing a compensation value by means of a fuzzy inference calculation based on said segment distance and said shift distance, and
   compensating said calculated drive signal using said compensation value to produce a compensated drive signal for moving said actuator said segment distance;
   storing each of said compensated drive signals for driving said actuator during operation;
   inputting an access command signal which has data of a starting position, a target position, and moving direction;
   reading from storage a first compensated drive signal corresponding to a segment distance equal to a moving distance, said moving distance being a distance between said starting position and said target position;
   reading from storage second and third compensated drive signals having second and third segment distances greater than and less than said moving distance when a segment distance does not equal said moving distance;
   interpolating a compensated drive signal for driving said actuator to move said moving distance based on said second and third compensated drive signals, said second and third segment distances, and said moving distance;
   producing a correcting value by means of a fuzzy inference calculation based on said moving distance and said second and third segment distances;
   correcting said interpolated compensated drive signal using said correcting value to produce a corrected drive signal; and
   driving said actuator using one of said first compensated drive signal and said corrected drive signal.

5. The method as in claim 4, wherein a distance variation is calculated by subtracting said shift distance from a segment distance, and said compensation value is produced by means of a fuzzy inference calculation based on said distance variation.

6. The method as in claim 4, wherein the compensation value is at least one of acceleration, acceleration time, deceleration, and deceleration time.

7. The method as in claim 4, wherein after the interpolating step the method comprises the steps of:
   calculating a midpoint distance which is halfway between said second and third segment distances;
   subtracting said second segment distance from said moving distance when said moving distance is less than or equal to said midpoint distance to produce an interpolation distance variation; and
   subtracting said midpoint distance from said third segment distance when said moving distance is greater than said midpoint distance to produce an interpolation distance variation; and wherein said correcting value is produced by means of a fuzzy inference calculation based on said moving distance and said interpolation distance variation.

8. A method for controlling an actuator having a predetermined moving range, the predetermined moving range being divided into a plurality of segments having beginnings which define different discrete segment distances from a starting point, and compensated drive signals, corresponding to said segment distances, for driving said actuator a distance equal to said segment distances, said compensated drive signals being stored, the method comprising the steps of:

inputting an access command signal which has data of a starting position, a target position, and moving direction;

reading from storage a first compensated drive signal corresponding to a segment distance equal to a moving distance, said moving distance being a distance between said starting position and said target position;

reading from storage second and third compensated drive signals having second and third segment distances greater than and less than said moving distance when a segment distance does not equal said moving distance;

interpolating a compensated drive signal for driving said actuator to move said moving distance based on said second and third compensated drive signals, said second and third segment distances, and said moving distance;

producing a correcting value by means of a fuzzy inference calculation based on said moving distance and said second and third segment distances;

correcting said interpolated compensated drive signal using said correcting value to produce a corrected drive signal; and driving said actuator using one of said first compensated drive signal and said corrected drive signal.

9. The method as in claim 8, wherein after the interpolating step the method comprises the steps of:

calculating a midpoint distance which is halfway between said second and third segment distances;

subtracting said second segment distance from said moving distance when said moving distance is less than or equal to said midpoint distance to produce an interpolation distance variation; and subtracting said midpoint distance from said third segment distance when said moving distance is greater than said midpoint distance to produce an interpolation distance variation; and wherein said correcting value is produced by means of a fuzzy inference calculation based on said moving distance and said interpolation distance variation.

10. An apparatus for initializing an actuator controller using fuzzy logic, comprising:

dividing means for dividing a predetermined moving range of said actuator into a plurality of segments having equal length, a beginning of each segment defining a different discrete segment distance from a starting point;

calculating means for calculating a drive signal which includes data of at least one of acceleration, acceleration time, deceleration, and deceleration time of said actuator to move said actuator a segment distance;

driving signal output means for outputting said calculated drive signal to drive said actuator;

measuring means for measuring as a shift distance, a distance said actuator moved in response to said calculated drive signal;

fuzzy inference calculating means for producing a compensation value based on said segment distance and said shift distance;

compensating means for compensating said calculated drive signal using said compensation value to produce a compensated drive signal for moving said actuator said segment distance; and memory means for storing each of said compensated drive signals for driving said actuator during operation.

11. The apparatus as in claim 10, further comprising a means for computing a distance variation by subtracting said shift distance from a segment distance, and wherein said fuzzy inference calculating means produces a compensation value based on said distance variation.

12. The apparatus as in claim 10, wherein the compensation value is at least one of acceleration, acceleration time, deceleration, and deceleration time.

13. An apparatus for initializing an actuator controller and performing control therewith using fuzzy logic, comprising:

dividing means for dividing a predetermined moving range of said actuator into a plurality of segments having equal length, a beginning of each segment defining a different discrete segment distance from a starting point;

calculating means for calculating a drive signal which includes data of at least one of acceleration, acceleration time, deceleration, and deceleration time of said actuator to move said actuator a segment distance;

measuring means for measuring as a shift distance, a distance said actuator moved in response to said calculated drive signal;

first fuzzy inference calculating means for producing a compensation value based on said segment distance and said shift distance;

compensating means for compensating said calculated drive signal using said compensation value to produce a compensated drive signal for moving said actuator said segment distance;

memory means for storing each of said compensated drive signals for driving said actuator during operation;

input means for inputting an access command signal which has data of a starting position, a target position, and moving direction;

first reading means for reading from storage a first compensated drive signal corresponding to a segment distance equal to a moving distance, said moving distance being a distance between said starting position and said target position;

second reading means for reading from storage second and third compensated drive signals having second and third segment distances greater than and less than said moving distance when a segment distance does not equal said moving distance;

interpolating means for interpolating a compensated drive signal for driving said actuator to move said moving distance based on said second and third compensated drive signals, said second and third segment distances, and said moving distance;

second fuzzy inference calculating means for producing a correcting value based on said moving distance and said second and third segment distances;

correcting means for correcting said interpolated compensated drive signal using said correcting value to produce a corrected drive signal; and driving means for driving said actuator using one of said calculated drive signal, said first compensated drive signal and said corrected drive signal.

14. The apparatus as in claim 13, further comprising:

midpoint calculating means for calculating a midpoint distance which is halfway between said second and third segment distances;

first difference means for subtracting said second segment distance from said moving distance when said moving distance is less than or equal to said midpoint distance to produce an interpolation distance variation; and second difference means for subtracting said midpoint distance from said third segment distance when said moving distance is greater than said midpoint distance to produce an interpolation distance variation; and wherein said second fuzzy inference calculating means produces said correcting value based on said moving distance and said interpolation distance variation.

15. The apparatus as in claim 13, further comprising a means for computing a distance variation by subtracting said shift distance from a segment distance, and wherein said first fuzzy inference calculation produces said compensation value based on said distance variation.

16. The apparatus as in claim 13, wherein the compensation value is at least one of acceleration, acceleration time, deceleration, and deceleration time.

17. An apparatus for controlling an actuator having a predetermined moving range, the predetermined moving range being divided into a plurality of segments having beginnings which define different discrete segment distances from a starting point, and compensated drive signals, corresponding to said segment distances, for driving said actuator a distance equal to said segment distances, said compensated drive signals being stored, the method comprising the steps of:

input means for inputting an access command signal which has data of a starting position, a target position, and moving direction;

first reading means for reading from storage a first compensated drive signal corresponding to a segment distance equal to a moving distance, said moving distance being a distance between said starting position and said target position;

second reading means for reading from storage second and third compensated drive signals having second and third segment distances greater than and less than said moving distance when a segment distance does not equal said moving distance;

interpolating means for interpolating a compensated drive signal for driving said actuator to move said moving distance based on said second and third compensated drive signals, said second and third segment distances, and said moving distance;

a fuzzy inference calculating means for producing a correcting value based on said moving distance and said second and third segment distances;

correcting means for correcting said interpolated compensated drive signal using said correcting value to produce a corrected drive signal; and driving means for driving said actuator using one of said first compensated drive signal and said corrected drive signal.

18. The apparatus as in claim 17, further comprising:

midpoint calculating means for calculating a midpoint distance which is halfway between said second and third segment distances;

first difference means for subtracting said second segment distance from said moving distance when said moving distance is less than or equal to said midpoint distance to produce an interpolation distance variation; and second difference means for subtracting said midpoint distance from said third segment distance when said moving distance is greater than said midpoint distance to produce an interpolation distance variation; and wherein said fuzzy inference calculating means produces said correcting value based on said moving distance and said interpolation distance variation.

* * * * *